(12) United States Patent
Nakatsugawa et al.

(10) Patent No.: US 9,337,708 B2
(45) Date of Patent: May 10, 2016

(54) MAGNETIC GEAR-TYPE ELECTRIC ROTATING MACHINE

(75) Inventors: Junnosuke Nakatsugawa, Tokyo (JP); Yuji Enomoto, Tokyo (JP); Norihisa Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 355 days.

(21) Appl. No.: 14/126,669

(22) PCT Filed: Jun. 27, 2011

(86) PCT No.: PCT/JP2011/003639
§ 371 (c)(1),
(2), (4) Date: Dec. 16, 2013

(87) PCT Pub. No.: WO2013/001557
PCT Pub. Date: Jan. 3, 2013

(65) Prior Publication Data
US 2014/0132099 A1    May 15, 2014

(51) Int. Cl.
*H02K 49/00* (2006.01)
*H02K 16/02* (2006.01)
*H02K 49/10* (2006.01)
*H02K 7/11* (2006.01)
*H02K 21/12* (2006.01)

(52) U.S. Cl.
CPC .................. *H02K 16/02* (2013.01); *H02K 7/11* (2013.01); *H02K 21/12* (2013.01); *H02K 49/102* (2013.01)

(58) Field of Classification Search
CPC ...... H02K 16/02; H02K 49/102; H02K 21/12
USPC ..................... 310/26, 36, 46, 102 R, 114, 266
See application file for complete search history.

(56) References Cited

U.S. PATENT DOCUMENTS

| 6,700,272 | B1  | 3/2004 | Lindner |
| 6,794,781 | B2* | 9/2004 | Razzell .................... H02K 7/11 290/55 |

(Continued)

FOREIGN PATENT DOCUMENTS

| JP | 11-155268 A  | 6/1999 |
| JP | 2004-72858 A | 3/2004 |

(Continued)

OTHER PUBLICATIONS

Corresponding International Search Report with English Translation dated Sep. 20, 2011 (five pages).

*Primary Examiner* — Thanh Lam
(74) *Attorney, Agent, or Firm* — Crowell & Moring LLP (57) ABSTRACT

The present invention relates to a magnetic gear type electric rotating machine. Specifically, the purpose is to provide a magnetic gear type electric rotating machine with which the intensity of a permanent magnetic field can be improved without increasing material and manufacturing costs, and deterioration of torque transmission characteristics can be prevented. To this end, in the present invention, concave and convex sections are provided on a surface of at least one of cores (12, 22) for a first permanent magnetic field (1) and a second permanent magnetic field (2). The convex sections (13) are arranged along the circumferential direction at the center sections of permanent magnetic poles (11*a*, 11*b*), and the concave sections (14) are arranged along the circumferential direction at the edge sections of the permanent magnetic poles (11*a*, 11*b*).

8 Claims, 7 Drawing Sheets

(56) References Cited

U.S. PATENT DOCUMENTS

| | | |
|---|---|---|
| 2010/0283345 A1 | 11/2010 | Atallah et al. |
| 2011/0037333 A1* | 2/2011 | Atallah ................ H02K 51/00 310/98 |
| 2011/0115326 A1* | 5/2011 | Clark ................ H02K 7/11 310/114 |
| 2011/0121672 A1* | 5/2011 | Calverley ................ H02K 1/08 310/103 |
| 2011/0163623 A1* | 7/2011 | Rens ................ H02K 7/11 310/114 |

FOREIGN PATENT DOCUMENTS

| | | |
|---|---|---|
| JP | 2009-95110 A | 4/2009 |
| JP | 2009-535012 A | 9/2009 |
| JP | 2010-158130 A | 7/2010 |
| JP | 2010-273521 A | 12/2010 |
| WO | WO 2007/123057 A1 | 11/2007 |
| WO | WO 2009/130456 A2 | 10/2009 |

* cited by examiner

MAGNETIC GEAR-TYPE ELECTRIC ROTATING MACHINE

TECHNICAL FIELD

The present invention relates to a magnetic gear-type electric rotating machine.

BACKGROUND ART

In recent years, a magnetic flux modulated type magnetic gear, in which a high torque density is realized by using a rare-earth magnet, has been studied and developed (Non-PTL 1). PTL 1 discloses a magnetic gear-type electric rotating machine in which a magnetic gear and a winding type stator are integrated, and more specifically, an improvement of intensity of a permanent magnet field system.

Furthermore, in Non-PTL 2, a configuration in which a permanent magnet is divided in a direction of stack length in a magnetic gear mechanism is disclosed. In Non-PTL 3, a configuration in which an interior permanent magnet is used in a rotor structure of a magnetic gear mechanism is disclosed.

CITATION LIST

Patent Literature

PTL 1: WO2009/130456

Non-Patent Literature

Non-PTL 1: K. Atallah and D. Howe: A Novel High-Performance Magnetic Gear: IEEE Transactions on Magnetics, VoL. 37, No. 4, pp. 2844-2846
Non-PTL 2: Journal of the Magnetics Society of Japan Vol. 33, No. 2, 2009 "A Way to Improve Efficiency of Permanent-Magnet Magnetic Gears"
Non-PTL 3: Journal of the Magnetic Society of Japan Vol. 34, No. 3, 2010 "Consideration of Rotor Structure in Permanent-Magnet Magnetic Gears"

SUMMARY OF INVENTION

Technical Problem

The above-described Non-PTL 1 discloses a principle and magnetic characteristics of a magnetic gear, but a mechanism and intensity thereof is not considered.

On the other hand, in the above-described PTL 1, a permanent magnet field system existing between a winding type stator and a pole piece is constituted by affixing a permanent magnet on both front and back surfaces of a high intensity magnetic material to improve the intensity thereof. However, affixing a permanent magnet on both surfaces increases the number of permanent magnets required, which leads to increased material and manufacturing costs. Furthermore, in a case where the permanent magnet field system is rotated at a high speed, in order to prevent scattering of a permanent magnet affixed outside due to a centrifugal force, it is necessary to add an anti-scattering member to an outer periphery portion of the permanent magnet, and as a result, a magnetic gap is increased, a magnetic resistance is increased, and a torque transmission characteristic is decreased.

Note that in the above-described Non-PTLs 2 and 3, a loss due to an eddy current in a magnetic gear and the like are considered, but a mechanism and intensity thereof are not considered.

The present invention has been made in view of the above-described problem, and an object thereof is to provide a magnetic gear-type electric rotating machine with which the intensity of a permanent magnet field system can be improved and a decrease of the torque transmission characteristics can be prevented without increasing the material and manufacturing costs.

Solution to Problem

In order to solve the above problem, for example, in a magnetic gear-type electric rotating machine including: a first permanent magnet field system having a plurality of permanent magnet magnetic poles and a core supporting the permanent magnet magnetic pole; a second permanent magnet field system having a plurality of permanent magnet magnetic poles, the number of poles thereof being different from that of the first permanent magnet field system, and a core supporting the permanent magnet magnetic pole; a modulation magnetic pole provided between the first permanent magnet field system and the second permanent magnet field system, and configured to modulate the number of poles of the first and second permanent magnet field systems by having a plurality of pole pieces; and a winding type stator having a plurality of windings interacting with the first permanent magnet field system, a recess and a projection may be provided on a surface of a core of at least one of the first permanent magnet field system or the second permanent magnet field system.

In order to prevent a short circuit of a permanent magnet magnetic flux, with respect to the recess and the projection provided on the surface of the core, it is preferred that the projection portion be provided at a central part of the permanent magnet magnetic pole in a circumferential direction, and the recess portion be provided at an edge of the permanent magnet magnetic pole in the circumferential direction.

The core of the first permanent magnet field system may be provided between the permanent magnet magnetic pole of the first permanent magnet field system and the pole pieces or between the permanent magnet magnetic pole of the first permanent magnet field system and the winding type stator.

With respect to the recess and the projection provided on the surface of the core, the projection portion may be configured to be a curved or plane surface.

The core, having the recess and the projection on a surface thereof, may be formed by cutting a tape-like magnetic material thin plate into a recess and projection shape and by bending the recess portion of the magnetic material thin plate, which has been cut.

Furthermore, the recess and the projection may be provided on a surface of the permanent magnet magnetic pole of at least one of the first permanent magnet field system or the second permanent magnet field system.

Advantageous Effects of Invention

According to an embodiment of the present invention, it is possible to improve intensity of a permanent magnet field system while decreasing material and manufacturing costs of a magnetic gear-type electric rotating machine.

DESCRIPTION OF EMBODIMENTS

Embodiments of a magnetic gear-type electric rotating machine according to the present invention are described with reference to FIGS. 1 to 7. Note that in the following embodiments, a radial gap type is used in descriptions; however, these embodiments can also be realized in the same way by using other types (e.g., axial gap type, linear type, etc.).

Example 1

Figure 1:
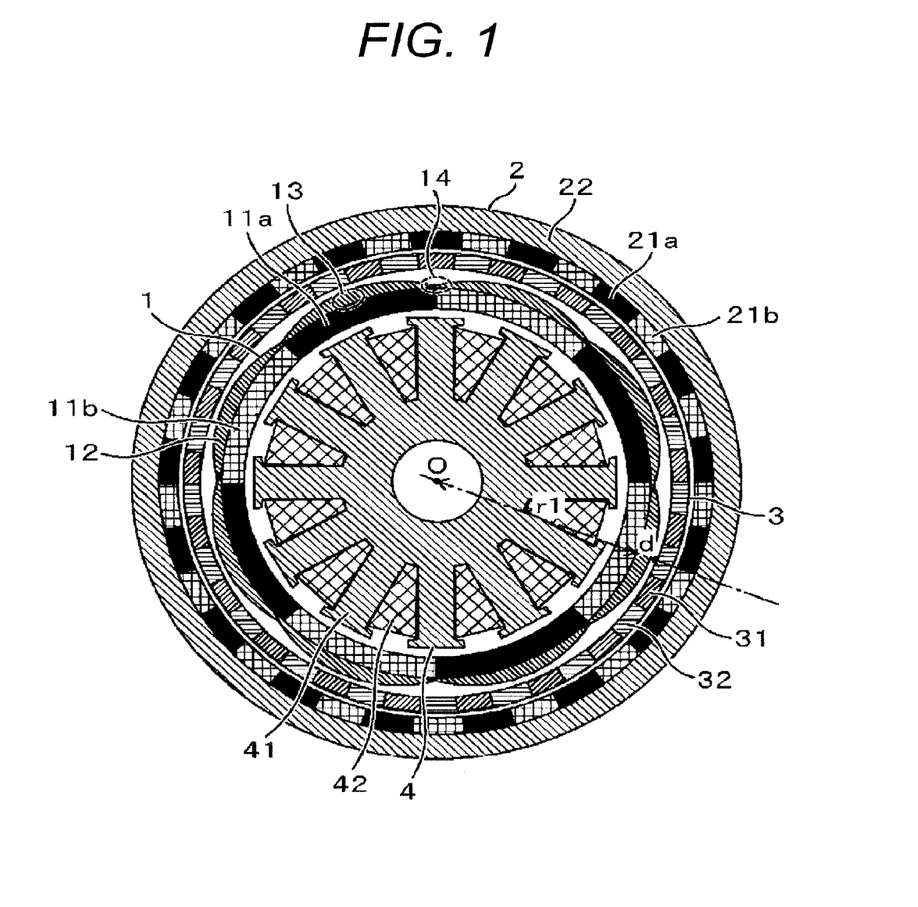
FIG. 1 is a sectional view illustrating a magnetic gear-type electric rotating machine of Example 1 according to the present invention.

Hereinafter, a first Example according to the present invention is described using FIG. 1. FIG. 1 is a sectional view of a magnetic gear-type electric rotating machine according to the first Example of the present invention.

The magnetic gear-type electric rotating machine includes: a first permanent magnet field system 1 having a plurality of permanent magnet magnetic poles; a second permanent magnet field system 2 having a plurality of permanent magnet magnetic poles, the number of poles thereof being different from that of the first permanent magnet field system 1; a modulation magnetic pole 3 having a plurality of pole pieces; and a winding type stator 4 having a plurality of windings that interacts with the first permanent magnet field system. In a case where the modulation magnetic pole 3 is fixed in addition to the winding type stator 4, the first permanent magnet field system 1 rotates in synchronization with a rotation field system formed by the winding type stator 4, and the second permanent magnet field system 2 rotates at a speed determined by a gear ratio. In a case where the second permanent magnet field system 2 is fixed in addition to the winding type stator 4, the first permanent magnet field system 1 rotates in synchronization with the rotation field system formed by the winding type stator 4, and the modulation magnetic pole 3 rotates at a speed determined by a gear ratio.

The first permanent magnet field system 1 has a plurality of permanent magnet magnetic poles 11a and 11b alternately disposed in a circumferential direction, and has a core 12 on an outer periphery side thereof. Here, the permanent magnet magnetic poles 11a and 11b have a polarity different from each other. The second permanent magnet field system 2 has a plurality of permanent magnet magnetic poles 21a and 21b alternately disposed in the circumferential direction, the number of poles thereof being different from that of the first permanent magnet field system 1, and has a core 22 on an outer periphery side thereof. Here, the permanent magnet magnetic poles 21a and 21b have a polarity different from each other. The modulation magnetic pole 3 includes a plurality of pole pieces 31, the number thereof being a sum of the number of pole pairs of the first permanent magnet field system 1 and the number of pole pairs of the second permanent magnet field system, and a non-magnetic case 32, which includes the pole pieces 31. The modulation magnetic pole 3 is disposed between the first permanent magnet field system 1 and the second permanent magnet field system 2. The winding type stator 4 includes a core 41 having a plurality of teeth and a winding 42 forming a rotation field system, and is disposed in an innermost periphery portion.

A material of the core 12 of the first permanent magnet field system 1, the core 22 of the second permanent magnet field system 2, the pole pieces 31, and the core 41 of the winding type stator includes a soft magnetic material such as electrical steel, a dust core, an amorphous metal, or permendur. To prevent an eddy current due to a magnetic flux change, when the electrical steel or the like is used, it is configured by layering thin plates. A material of the non-magnetic case 32 includes a resin mold, a fiber reinforced plastic (FRP), a carbon fiber, a glass fiber, or the like.

In this Example, the core 12 of the first permanent magnet field system 1 is provided between the permanent magnet magnetic poles 11a and 11b of the first permanent magnet field system 1 and the modulation magnetic pole 3. Therefore, in a case where the first permanent magnet field system 1 is rotated at a high speed, scattering caused by a centrifugal force applied to the permanent magnets 11a and 11b can be prevented by the core 12, and the intensity of the first permanent magnet field system 1 can be increased. Furthermore, since the permanent magnet magnetic poles 11a and 11b are near the winding type stator 4, it is possible to increase a torque acting between the winding type stator 4 and the first permanent magnet field system 1.

A recess and a projection are provided on a surface of the core 12 of the first permanent magnet field system 1, a projection portion 13 is disposed at a central part in the circumferential direction of the permanent magnet magnetic poles 11a and 11b, and a recess portion 14 is disposed at an edge in the circumferential direction of the permanent magnet magnetic poles 11a and 11b. That is, an outer peripheral surface of the permanent magnet magnetic pole 11a and the permanent magnet magnetic pole 11b forms a cylindrical shape having a radius r1 with a center thereof at a point O, and a thickness d of the core 12 changes along the circumferential direction of this cylindrical surface. The thickness d of the core 12 becomes thick at the projection portion 13 and becomes thin at the recess portion 14. Therefore, the thickness d of the core 12 is large at the central part of the permanent magnet magnetic poles 11a and 11b in the circumferential direction, and the thickness d of the core 12 is small at the edge of the permanent magnet magnetic poles 11a and 11b in the circumferential direction. Using the outer peripheral surface of the permanent magnet magnetic poles 11a and 11b as a standard, the projection portion 13 is formed by the thickness d of the core 12 becoming large, and the recess portion 14 is formed by the thickness d of the core 12 becoming small. Note that the thickness d of the core 12 is defined by a width dimension in a diameter direction (a length d of a section in which a line segment extending in the diameter direction and passing through the center O of the electric rotating machine crosses with the core 12). In the below described each Example, in the same way as this Example, the recess and the projection formed on the surface of the core or the permanent magnet magnetic pole are defined by a dimension in the diameter direction (the length d of a section in which a line segment extending in the diameter direction and passing through the center O of the electric rotating machine crosses with the core 12). Accordingly, it is possible to prevent a short circuit of the magnetic flux occurring between the permanent magnet magnetic poles 11a and 11b, and to prevent a decrease in the effective magnetic flux interacting with the second permanent magnet field system 2.

Furthermore, the recess and the projection may also be provided on an outer peripheral surface of the core 22 of the second permanent magnet field system 2, and by providing the recess and the projection on the surface thereof, it is possible to increase a surface area per the same body, whereby radiation and cooling effects can be increased.

Example 2

Figure 2:
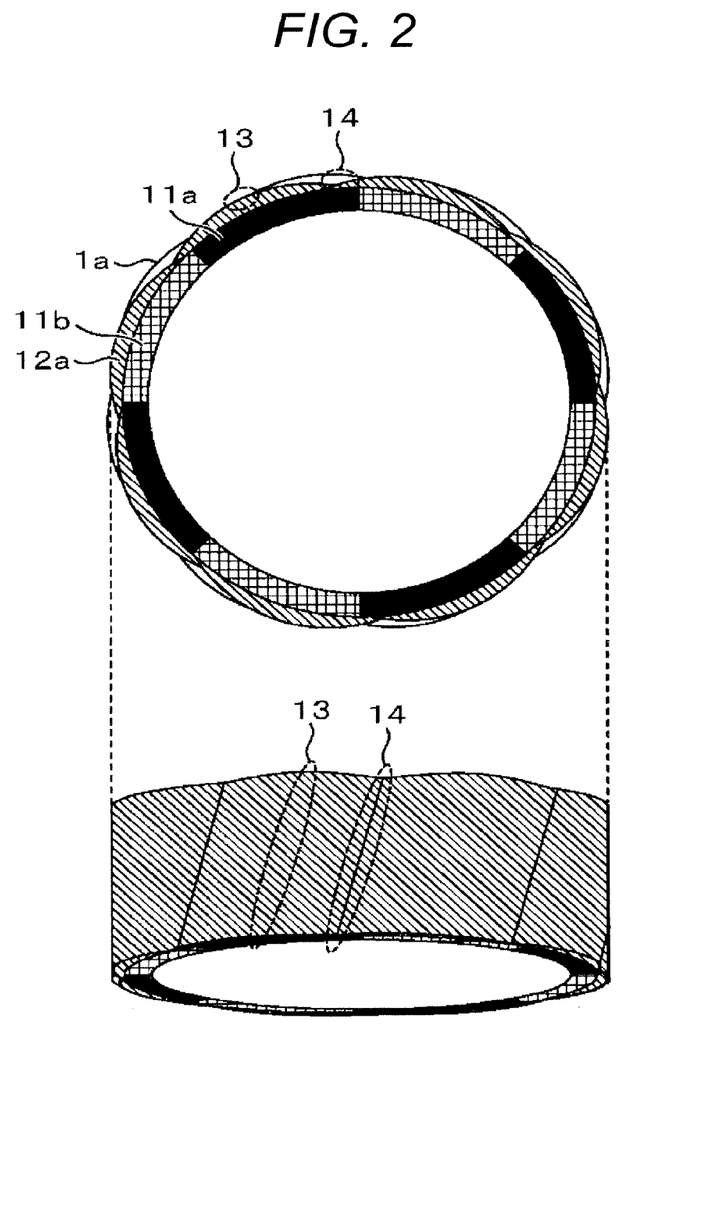
FIG. 2 is an external view illustrating a first permanent magnet field system of Example 2 according to the present invention.

Then, a second Example according to the present invention is described by using FIG. 2. Note that in this Example, the second permanent magnet field system 2, the modulation magnetic pole 3, and the winding type stator 4 are omitted because these are the same as those in FIG. 1, and only a first permanent magnet field system 1a is illustrated.

In this Example, a core 12a of the first permanent magnet field system 1a is layered by shifting in a circumferential direction centering on a rotational shaft, and a row of a recess and a projection provided on a surface of the core 12a is configured to be skewed relative to the rotational shaft. Then, by the recess and the projection on the core surface rotating, air between the first permanent magnet field system 1a and the modulation magnetic pole 3 is flowed in an axial direction, whereby a radiation effect of the magnetic gear-type electric rotating machine can be increased. Furthermore, by using a so-called skew configuration, a cogging torque and a torque ripple occurring between the first permanent magnet field system 1a and the modulation magnetic pole 3 can be decreased.

Note that, as illustrated in FIG. 2, the skew may have a certain angle relative to the axial direction, or may be turned back in a V-shape at a central part in the axial direction. In a case where the skew has a certain angle relative to the axial direction, a force is also generated in the axial direction, but in a case where the skew is turned back in a V-shape, the force in the axial direction can be cancelled, and a load on a bearing can be decreased.

Example 3

Figure 3:
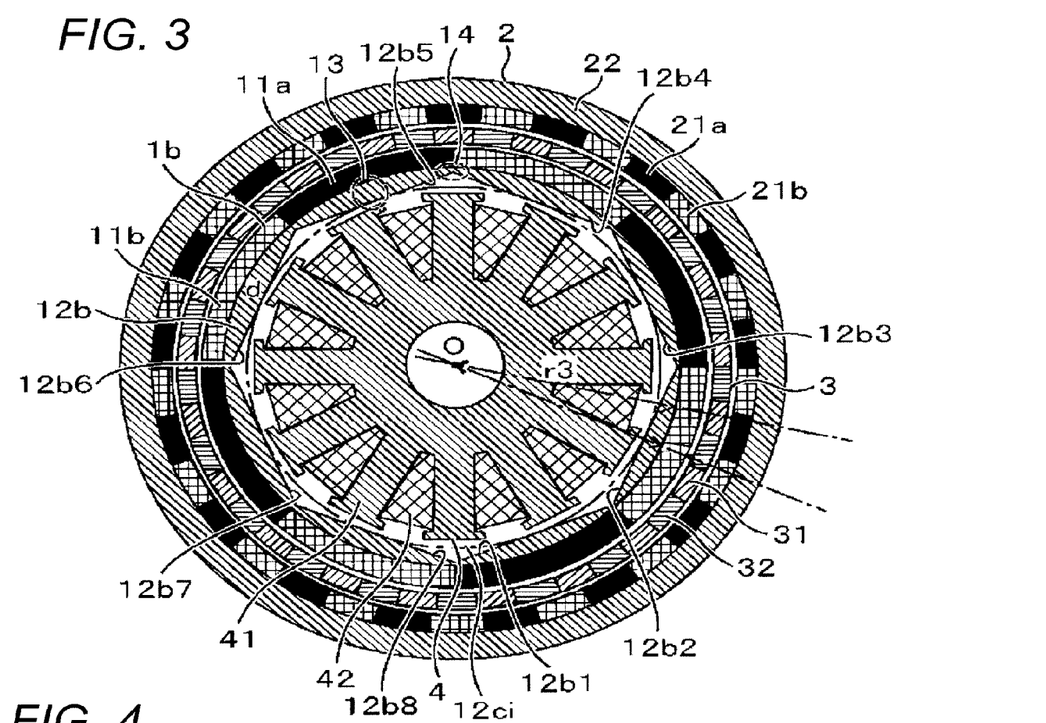
FIG. 3 is a sectional view illustrating a magnetic gear-type electric rotating machine of Example 3 according to the present invention (part 1).
Figure 4:
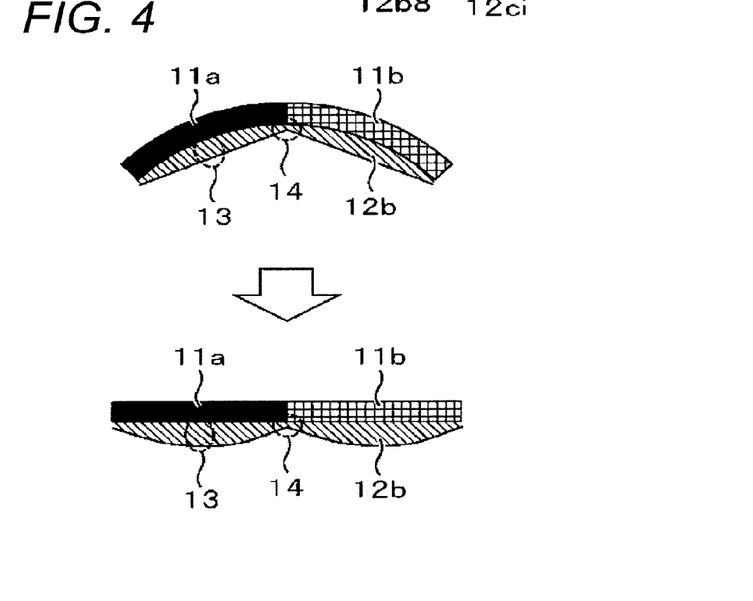
FIG. 4 is a view illustrating a recess and a projection on a surface of a core of Example 3 according to the present invention.
Figure 5:
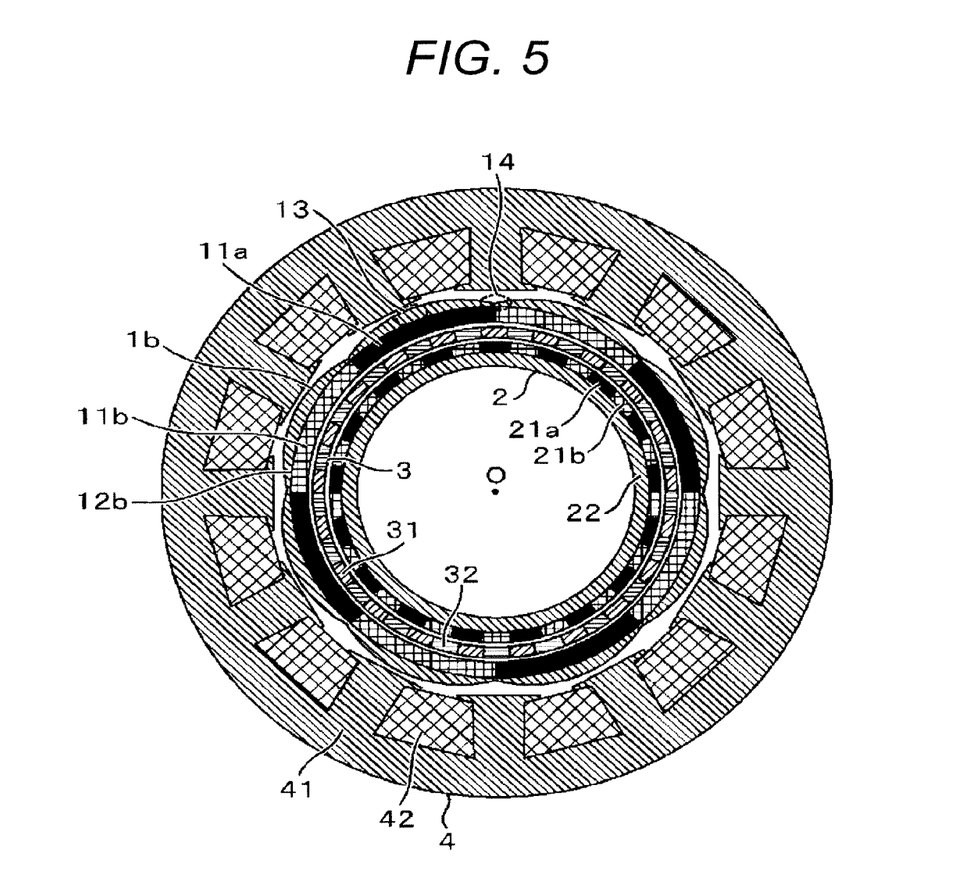
FIG. 5 is a sectional view illustrating a magnetic gear-type electric rotating machine of Example 3 according to the present invention (part 2).

Then, a third Example according to the present invention is described by using FIGS. 3 to 5. FIG. 3 is a sectional view of a magnetic gear-type electric rotating machine according to the third Example of the present invention. It is different from FIG. 1 in that the first permanent magnet field system 1 is replaced with a first permanent magnet field system 1b.

In this Example, a core 12b of the first permanent magnet field system 1b is provided between the permanent magnet magnetic poles 11a and 11b of the first permanent magnet field system 1b and the winding type stator 4. Since the permanent magnet magnetic poles 11a and 11b are near the modulation magnetic pole 3, it is possible to increase torque acting between the first permanent magnet field system 1b and the second permanent magnet field system 2. Furthermore, since a surface of the core 12b of the first permanent magnet field system 1b is on an inner periphery side, a recess and a projection on the surface of the core 12b are provided on the inner periphery side. That is, an inner peripheral surface of the permanent magnet magnetic pole 11a and the permanent magnet magnetic pole 11b forms a cylindrical shape having a radius r3 and centering on a point O, which is a rotation center, and a thickness d of the core 12b changes along a circumferential direction of this cylindrical surface. The thickness d of the core 12b becomes thick at the projection portion 13, and becomes thin at the recess portion 14. Therefore, the thickness d of the core 12b is large at a central part in a circumferential direction of the permanent magnet magnetic poles 11a and 11b, and the thickness d of the core 12b is small at an edge in the circumferential direction of the permanent magnet magnetic poles 11a and 11b.

The core 12b includes a plurality of planer sections 12b1 to 12b8, which are divided such that an inner peripheral surface side thereof is bended for each of the permanent magnet magnetic poles 11a and 11b (configured as a plurality of linear sections in a cross section in FIG. 3). A projection portion 13, which is relatively projected against a cylindrical surface (circle) 12ci, is formed in a part where a space in a radius direction becomes small between a cylindrical surface (circle) 12ci, which has a center thereof at the rotation center O and a fixed radius, and the planer sections 12b1 to 12b8, and a recess portion 14, which is relatively recessed against the cylindrical surface (circle) 12ci, is formed in a part where the space in the radius direction becomes large.

In this Example, with respect to the recess and the projection provided on the surface of the core 12b of the first permanent magnet field system, a part equivalent to the projection portion is configured to be a plane surface, and a description for this is given using FIG. 4.

A figure at the top in FIG. 4 illustrates a part of the core 12b of the first permanent magnet field system. Assuming that arc-shaped permanent magnets 11a and 11b are opened linearly, the projection portion 13 and the recess portion 14 of the core 12b of the permanent magnet field system appear as a figure at the bottom in FIG. 4. Since in this way, the projection portion 13 of the core of the first permanent magnet field system is provided at the central part in the circumferential direction of the permanent magnet magnetic poles 11a and 11b, and the recess portion 14 is provided at an edge in the circumferential direction of the permanent magnet magnetic poles 11a and 11b, it is possible to prevent a short circuit of a magnetic flux occurring between the permanent magnet magnetic poles 11a and 11b and to prevent a decrease of an effective magnetic flux, which interacts with the winding type stator 4.

In FIG. 3, an Example has been illustrated in which the winding type stator 4 is disposed in an innermost periphery portion, and the first permanent magnet field system 1, the modulation magnetic pole 3, and the second permanent magnet field system 2 are disposed in an outer periphery portion in order; however, it is also possible to dispose them such that the inner periphery side and the outer periphery side are inverted. In FIG. 5, an Example is illustrated in which these are inversely disposed.

In FIG. 5, the winding type stator 4 is disposed in an outermost periphery portion, and the first permanent magnet field system 1b, the modulation magnetic pole 3, and the second permanent magnet field system 2 are disposed in an inner periphery side in order. In this case, a recess and a projection of the core 12b of the first permanent magnet field system 1b are provided on the outer periphery side, and a part equivalent to the projection portion is configured to be a curved surface. Furthermore, since the core 12b is located on an outer periphery side of the permanent magnets 11a and 11b of the first permanent magnet field system 1b, in a case where the first permanent magnet field system 1b is rotated at a high speed, the core 12b can prevent scattering due to a centrifugal force applied to the permanent magnets 11a and 11b, and the intensity of the first permanent magnet field system 1b can be increased.

Example 4

Figure 6:
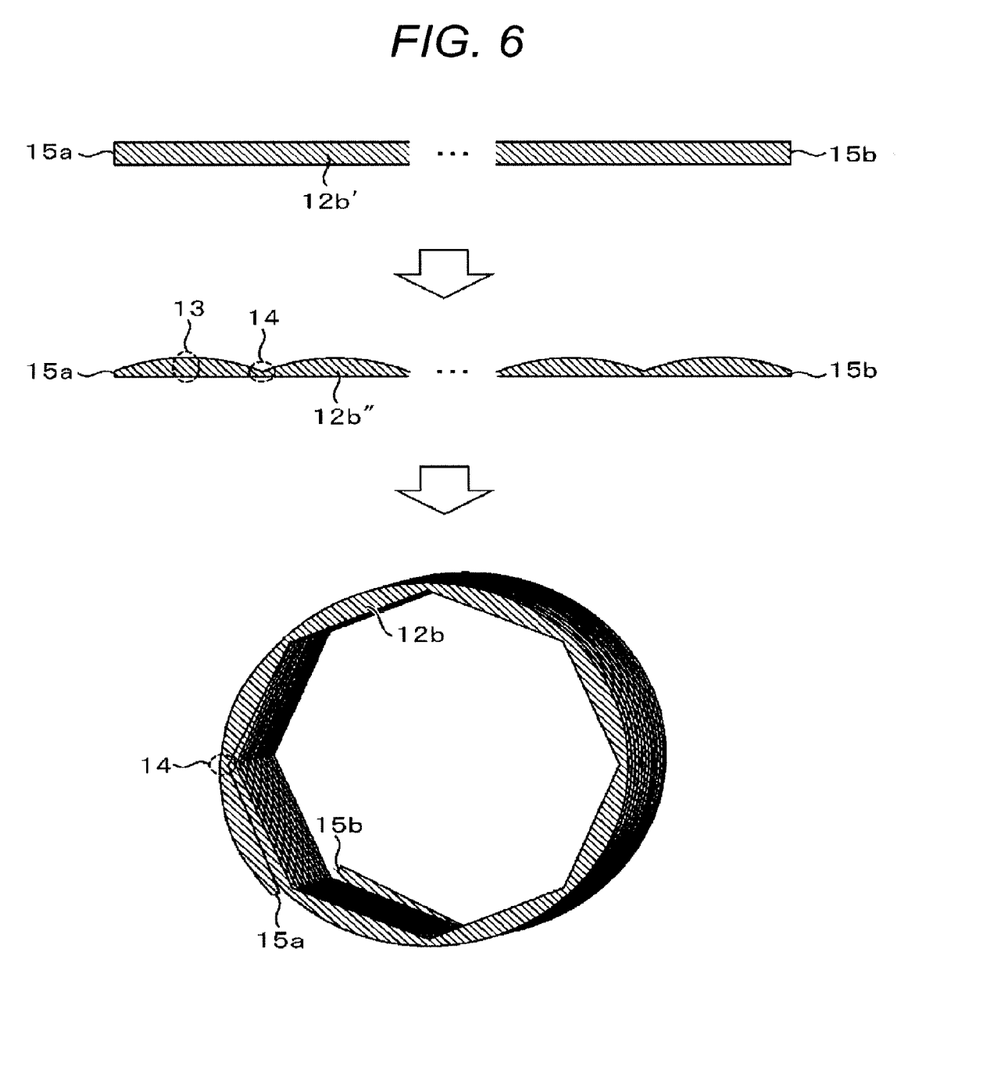
FIG. 6 is a view illustrating a method of manufacturing a core of a first permanent magnet field system of Example 4 according to the present invention.

Then, a fourth Example according to the present invention is described by using FIG. 6. FIG. 6 is an Example of a method of manufacturing the core 12b of the first permanent magnet field system 1b illustrated in FIG. 3.

A figure at the top in FIG. 6 illustrates a tape-like magnetic material thin plate 12b', which is thin in a paper surface direction and is long and narrow to the left and right. First, as illustrated in a figure in the middle in FIG. 6, the tape-like magnetic material thin plate 12b' is cut to form a magnetic material thin plate 12b" having the projection portion 13 and the recess portion 14. Then, as illustrated in the figure at the bottom in FIG. 6, the recess portion 14 is bended such that the magnetic material thin plate 12b" is configured to be a round shape. After a complete round has been made, by overlapping a projection portion with another projection portion and a recess portion with another recess portion, and for example, by attaching each surfaces, the core 12b can be made into a layered structure. In this way, by configuring a layered core from a thin tape-like magnetic material thin plate, it is possible to significantly increase a material utilization rate compared to a case where a core part is cut out from a flat plate-like magnetic material thin plate.

Example 5

Figure 7:
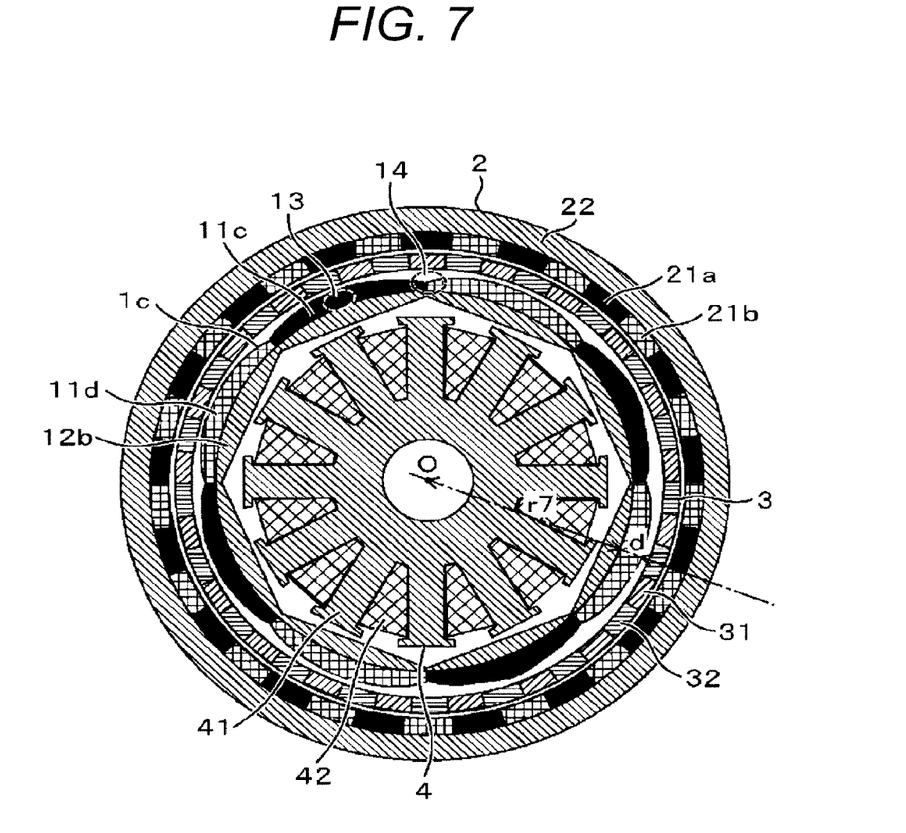
FIG. 7 is a sectional view illustrating a magnetic gear-type electric rotating machine of Example 5 according to the present invention.

Then, a fifth Example according to the present invention is described by using FIG. 7. FIG. 7 is a sectional view of a magnetic gear-type electric rotating machine according to the fifth Example of the present invention. It is different from FIG. 3 in that the first permanent magnet field system 1b is replaced with a first permanent magnet field system 1c, and the permanent magnet magnetic poles 11a and 11b of the first permanent magnet field system 1b is replaced with permanent magnet magnetic poles 11c and 11d.

In this Example, since a recess and a projection are provided on a surface of the permanent magnet magnetic poles 11c and 11d of the first permanent magnet field system 1b, and since a distance between an edge in the circumferential direction of the permanent magnet magnetic poles 11c and 11d and the pole pieces 31 is far, an eddy current occurring on the permanent magnet magnetic poles 11c and 11d can be prevented, and a loss can be decreased. That is, an inner peripheral surface of the permanent magnet magnetic pole 11c and the permanent magnet magnetic pole 11d and an outer peripheral surface of the core 12b form a cylindrical shape having a radius r7 and centering on the point O, and a thickness d of the permanent magnet magnetic poles 11c and 11d changes in a circumferential direction of this cylindrical surface. The thickness d of the permanent magnet magnetic poles 11c and 11d becomes thick at the projection portion 13 and becomes thin at the recess portion 14. Therefore, the thickness d is large at a central part in the circumferential direction of the permanent magnet magnetic poles 11c and 11d, and the thickness d is small at an edge in the circumferential direction thereof.

Example 6

Figure 8:
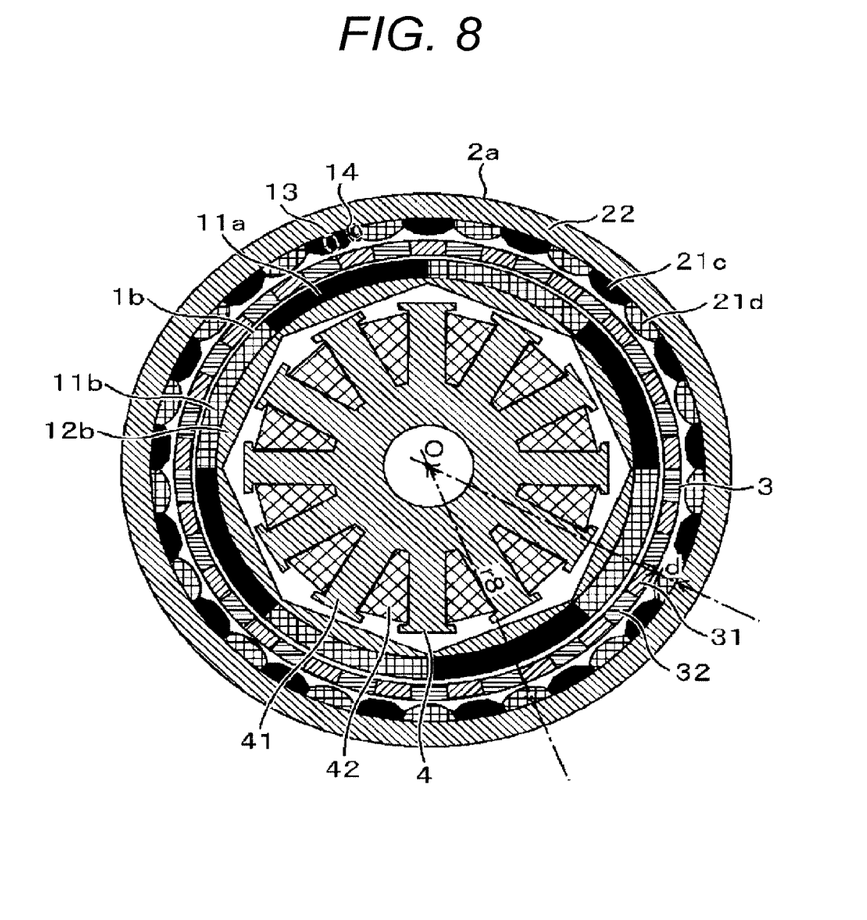
FIG. 8 is a sectional view illustrating a magnetic gear-type electric rotating machine of Example 6 according to the present invention.

In FIG. 7, an Example has been illustrated in which the recess and the projection are provided on the surface of the permanent magnet magnetic poles 11c and 11d of the first permanent magnet field system 1c; however, the recess and the projection may also be provided on a surface of the second permanent magnet field system 2. In FIG. 8, an Example is illustrated in which the recess and the projection are provided on the surface of the second permanent magnet field system.

FIG. 8 is different from FIG. 3 in that the second permanent magnet field system 2 is replaced with a second permanent magnet field system 2a, and permanent magnet magnetic poles 21a and 21b of the second permanent magnet field system 2a is replaced with permanent magnet magnetic poles 21c and 21d.

In this Example, since the recess and the projection are provided on the surface of the permanent magnet magnetic poles 21c and 21d of the second permanent magnet field system 2a, and since a distance between an edge in the circumferential direction of the permanent magnet magnetic poles 21c and 21d and the pole pieces 31 is far, an eddy current occurring on the permanent magnet magnetic poles 21c and 21d can be prevented, and a loss can be decreased. That is, an outer peripheral surface of the permanent magnet magnetic pole 21c and the permanent magnet magnetic pole 21d, and an inner peripheral surface of the core 22 form a cylindrical shape having a radius r8 and centering on the point O, and a thickness d of the permanent magnet magnetic poles 21c and 21d changes along a circumferential direction of this cylindrical surface. The thickness d of the permanent magnet magnetic poles 21c and 21d becomes thick at the projection portion 13 and becomes thin at the recess portion 14. Therefore, the thickness d is large at the central part of the permanent magnet magnetic poles 21c and 21d in a circumferential direction, and the thickness d becomes small at an edge in the circumferential direction.

It is also possible to combine the configuration in FIG. 7 in which the recess and the projection are provided on the surface of the permanent magnet magnetic poles 11c and 11d of the first permanent magnet field system 1b, and the configuration in FIG. 8 in which the recess and the projection are provided on the surface of the permanent magnet magnetic poles 21c and 21d of the second permanent magnet field system 2a.

Note that in the descriptions above, a radial gap type magnetic gear having an air gap in an outer periphery direction of the rotational shaft has been used; however, the above embodiments can also be realized in the same way by using other types (e.g. axial gap type having an air gap in an axial direction of the rotational shaft, a linear type which performs a linear drive, etc.).

In any of the embodiments, Examples have been given in which there are 8 poles in the first permanent magnet field system, 34 poles in the second permanent magnet field system, and 21 poles in the pole pieces; however, these embodiments can also be realized in the same way by using another number or another combination of numbers.

Furthermore, the above embodiments can also be realized in the same way in a magnetic gear device having no winding type stator.

REFERENCE SIGNS LIST 1, 1a, 1b, 1c first permanent magnet field system
2 second permanent magnet field system
3 modulation magnetic pole
4 winding type stator
11a, 11b, 11c, 11d first permanent magnet field system permanent magnet magnetic pole
12, 12a, 12b, 12b', 12b" first permanent magnet field system core 13 projection portion
14 recess portion
15a, 15b edge of tape-like magnetic material thin plate
21a, 21b permanent magnet magnetic pole of second permanent magnet field system
22 core of second permanent magnet field system
31 pole piece
32 non-magnetic case

The invention claimed is:

1. A magnetic gear-type electric rotating machine comprising:
   a first permanent magnet field system having a plurality of permanent magnet magnetic poles and a core supporting the permanent magnet magnetic pole;
   a second permanent magnet field system having a plurality of permanent magnet magnetic poles, the number of poles thereof being different from that of the first permanent magnet field system, and a core supporting the permanent magnet magnetic pole;
   a modulation magnetic pole provided between the first permanent magnet field system and the second permanent magnet field system, and configured to modulate the number of poles of the first and second permanent magnet field systems by having a plurality of pole pieces; and
   a winding type stator having a plurality of windings interacting with the first permanent magnet field system,
   wherein a recess and a projection are provided on a surface of a core of at least one of the first permanent magnet field system or the second permanent magnet field system.

2. The magnetic gear-type electric rotating machine according to claim 1,
   wherein a projection portion of the core, having a recess and a projection provided on a surface thereof, is provided near a central part in a circumferential direction of the permanent magnet magnetic pole supported by the core, and a recess portion of the core is provided near an edge in the circumferential direction of the permanent magnet magnetic pole supported by the core.

3. The magnetic gear-type electric rotating machine according to claim 1,
   wherein the core of the first permanent magnet field system is provided between the permanent magnet magnetic pole of the first permanent magnet field system and the modulation magnetic pole.

4. The magnetic gear-type electric rotating machine according to claim 1,
   wherein the core, having the recess and the projection provided on the surface thereof, is layered by shifting in a circumferential direction centering on a rotational shaft, and a row of the recess and the projection is configured to be skew relative to the rotational shaft.

5. The magnetic gear-type electric rotating machine according to claim 1,
   wherein the core of the first permanent magnet field system is provided between the permanent magnet magnetic pole of the first permanent magnet field system and the winding type stator.

6. The magnetic gear-type electric rotating machine according to claim 1,
   wherein the core is configured to include a plurality of planer sections having an inner peripheral surface side thereof divided for each permanent magnet magnetic pole, to have a center thereof at a rotation center, and to form the projection portion of the recess and the projection in a part where a space between a cylindrical surface, inscribed with the plurality of planer sections, and the plurality of planer sections becomes small in a radius direction while forming the recess portion in a part where a space becomes large.

7. The magnetic gear-type electric rotating machine according to claim 1,
   wherein the core, having the recess and the projection provided on the surface thereof, is formed by cutting a tape-like magnetic material thin plate in a recess and projection shape and by bending the recess portion of the magnetic material thin plate that has been cut.

8. A magnetic gear-type electric rotating machine comprising:
   a first permanent magnet field system having a plurality of permanent magnet magnetic poles and a core supporting the permanent magnet magnetic poles;
   a second permanent magnet field system having a plurality of permanent magnet magnetic poles, the number of poles thereof being different from that of the first permanent magnet field system, and a core supporting the permanent magnet magnetic poles;
   a modulation magnetic pole provided between the first permanent magnet field system and the second permanent magnet field system, and configured to modulate the number of poles of the first and second permanent magnet field systems by having a plurality of pole pieces; and
   a winding type stator having a plurality of windings interacting with the first permanent magnet field system,
   wherein a recess and a projection are provided on a surface of at least one of the permanent magnet magnetic poles of the first permanent magnet field system or the second permanent magnet field system.

* * * * *